US012607324B2

(12) United States Patent
Man et al.

(10) Patent No.: US 12,607,324 B2

(45) Date of Patent: Apr. 21, 2026

(54) LED LIGHT SOURCE WITH HIGH LUMINOUS INTENSITY

(71) Applicant: Manlux Technologies, Inc., San Mateo, CA (US)

(72) Inventors: Kin Wah Man, London (GB); Yeo Chun Hock, Malaysia (MY); Jian Qiang Liu, China (CN)

(73) Assignee: Manlux Technologies, Inc., San Mateo, CA (US)

( * ) Notice: Subject to any disclaimer, the term of this patent is extended or adjusted under 35 U.S.C. 154(b) by 0 days.

(21) Appl. No.: 18/910,344

(22) Filed: Oct. 9, 2024

(65) Prior Publication Data

US 2026/0098626 A1 Apr. 9, 2026

(51) Int. Cl.

| | |
|---|---|
| ***F21V 7/00*** | (2006.01) |
| ***F21V 7/09*** | (2006.01) |
| ***F21V 9/40*** | (2018.01) |
| ***F21V 19/00*** | (2006.01) |
| *F21Y 113/00* | (2016.01) |
| *F21Y 115/10* | (2016.01) |

(52) U.S. Cl.

CPC .............. *F21V 7/0083* (2013.01); *F21V 7/09* (2013.01); *F21V 9/40* (2018.02); *F21V 19/0015* (2013.01); *F21Y 2113/00* (2013.01); *F21Y 2115/10* (2016.08)

(58) Field of Classification Search

CPC . F21V 7/09; F21V 7/0083; F21V 9/40; F21V 19/0015

See application file for complete search history.

(56) References Cited

U.S. PATENT DOCUMENTS

| | | | | |
|---|---|---|---|---|
| 8,575,645 | B2 * | 11/2013 | Hwu | H10W 90/00 257/E33.058 |
| 9,680,076 | B2 * | 6/2017 | Itoh | H10H 20/856 |
| 10,062,814 | B2 * | 8/2018 | Tsuchiya | H10H 20/8506 |
| 11,569,410 | B2 * | 1/2023 | Shi | H10H 20/01 |
| 2006/0065957 | A1 * | 3/2006 | Hanya | H10W 90/00 257/676 |
| 2008/0042151 | A1 * | 2/2008 | Oh | H10W 90/00 257/E33.059 |

(Continued)

*Primary Examiner* — Abdulmajeed Aziz

*Assistant Examiner* — Nathaniel J Lee

(74) *Attorney, Agent, or Firm* — Patent Law Group; Brian Ogonowsky

(57) ABSTRACT

A light-emitting diode (LED) light source with a high luminous efficiency includes a support, having a light-emitting area. A plurality of LED chips are disposed on the light-emitting area, each LED chip having a top light-emitting surface and a plurality of side light-emitting surfaces. A reflective adhesive layer is disposed on the light-emitting area, where the adhesive layer forms a plurality of enclosing walls inclined outwards. A lower part of the enclosing wall has a convex curved surface, and upper portions of the enclosing wall are formed of flat inclined portions having different angles. Light emitted from the side light-emitting surface irradiates the enclosing wall and is reflected in multiple directions and irradiate outwards. The wall has grooves. A fluorescent material is deposited over the LED chips and within the enclosing wall. The fluorescent material also fills the grooves in the curved surface. Reflective posts may also be formed by the adhesive layer.

16 Claims, 4 Drawing Sheets

(56) References Cited

U.S. PATENT DOCUMENTS

| | | | | |
|---|---|---|---|---|
| 2010/0059770 | A1* | 3/2010 | Hsu | H10W 90/00 438/27 |
| 2010/0244061 | A1* | 9/2010 | Shirakawa | F21K 9/00 257/E33.056 |
| 2011/0309405 | A1* | 12/2011 | Lee | H10H 20/8506 257/E33.066 |
| 2014/0175482 | A1* | 6/2014 | Jang | H10H 20/856 257/98 |
| 2018/0212118 | A1* | 7/2018 | Chen | H10H 20/856 |
| 2021/0270445 | A1* | 9/2021 | Imada | G02F 1/133612 |

* cited by examiner

LED LIGHT SOURCE WITH HIGH LUMINOUS INTENSITY

TECHNICAL FIELD

The present invention relates to light-emitting diode (LED) light sources, and in particular to an LED light source using LED chips surrounded by molded reflectors to achieve a high luminous efficiency.

BACKGROUND

A light-emitting diode (LED) light source, comprising a support, is widely used in various daily lighting environments, wherein the support has a light-emitting area, a plurality of LED chips are disposed on the light-emitting area, the LED chips have a top light-emitting surface, and the LED chips have side light-emitting surfaces.

When the plurality of LED chips are fixed on the light-emitting area, the light-emitting area is covered with a fluorescent layer, and light emitted from the top light-emitting surface of the LED chip is transmitted through the fluorescent layer to irradiate outwards.

In the prior art, the light emitted from the side light-emitting surfaces of the LED chip is reflected in a transverse direction and cannot be reflected outwards away from the light-emitting area, which results in a low luminous efficiency of the LED light source. Further, light emitted from the side light-emitting surface directly irradiates an adjacent LED chip, so that the temperature of the LED light source is increased, thus reducing the lifetime of the LED light source.

SUMMARY

An object of the present invention is to provide a light-emitting diode (LED) light source with a high luminous efficiency, aiming to solve the problem of low luminous efficiency of a LED light source in the prior art.

The technical solution of one embodiment of the invention comprises a LED light source, including a support, where the support has a light-emitting area, and a plurality of LED chips, with gaps between them, are arranged in an array on the light-emitting area.

A molded adhesive layer (e.g., silicone infused with reflecting particles), also referred to as a glue layer, for reflecting light, is disposed on the light-emitting area. The glue layer is molded to form an array of sloped enclosing walls, each wall surrounding an empty area. The plurality of LED chips are respectively disposed in the plurality of empty areas such that a gap exists between the peripheral sides of the LED chips and its associated enclosing wall. In one embodiment, the LED chips and enclosing walls are square shaped.

Along a height direction of the glue layer, each enclosing wall is sloped outwards away from the LED chips. A lower part of the enclosing wall protrudes towards the LED chips to form a convex arc-shaped surface, and the arc-shaped surface extends downwards to abut the bottom of the light-emitting area. Upper portions of the enclosing wall are flat sections inclined at various angles. When light emitted from the side light-emitting surface of the LED chips irradiates the enclosing wall and the arc-shaped surface, the enclosing wall and the arc-shaped surface reflect the light in multiple upward directions, so that the light irradiates outwards away from the light-emitting area. Light is also reflected upwards by the reflective light emitting area between the LED chips and their respective enclosing walls.

In one embodiment, the LED chip has a square shape, the peripheral sides of the LED chips comprise four side light-emitting surfaces, and the enclosing wall has a square shape that encloses the peripheral sides of the LED chips.

Further, a top of the glue layer (enclosing walls) is arranged approximately flush with the top light-emitting surface, so that some light emitted upwards by the side surfaces passes over the enclosing walls to spread the light.

Further, the glue layer and LED chips are covered with a light-transmitting fluorescent layer, such that the fluorescent layer abuts against the enclosing wall and the side light-emitting surfaces to fill the gap.

Further, a top surface of the support (e.g., a heat conductive reflective aluminum) is recessed downwards to form the light-emitting area having sloped walls, and bottoms of the plurality of LED chips are fixed on a printed circuit at the bottom of the light-emitting area.

Further, the top surface of the support is above the tops of the LED chips, so light from the LED chips that is not reflected upward by the enclosing walls is reflected upward by the peripheral sloped walls of the light-emitting surface.

Further, a top of the fluorescent layer protrudes upwards to form a generally spherical protrusion extending above the light-emitting area.

Further, a peripheral side of the fluorescent layer is formed to have a surrounding ring extending beyond the light-emitting area. The surrounding ring is convexly arranged on the support, and the surrounding ring is coated with a light-reflecting layer to reflect back light emitted from the peripheral side of the light-emitting area.

Further, the enclosing wall is provided with a plurality of flat inclined surfaces, arranged obliquely, that are inclined outwards away from the LED chips respectively along the height direction of the glue layer. The angles of the inclined surfaces are different from one another to further spread the light.

Further, a plurality of horizontal, recessed strip grooves are disposed in one of the inclined surfaces and surround each LED chip.

The fluorescent layer is embedded in the plurality of inclined strip grooves to cause the fluorescent layer (e.g., a YAG material) to be integrally connected with the glue layer. Therefore, different thermal expansions and contractions of the materials do not delaminate the fluorescent layer from the enclosing walls. Further, each wall has a vertical groove that is filled with the fluorescent layer to additionally embed the fluorescent material into the glue layer.

Each wall is formed to have a surface facing one LED chip and an opposing surface to face an adjacent LED chip. Therefore, there can be a high density of LED chips in the light source.

Compared with the prior art, the enclosing walls of the molded reflective glue layer have multiple flat surfaces at a variety of angles and a rounded convex bottom portion to spread light into a desired beam shape having a generally uniform brightness across the beam. Light emitted from the various LED chips and the walls mix to provide the desired beam. The light emitted from the side light-emitting surfaces is reflected outwards by the enclosing wall, avoiding direct irradiation between the LED chips. Therefore, the temperature of the LED light source is lowered, and the lifetime of the LED light source is increased.

In another embodiment, the glue layer is molded to form reflective cylindrical posts at least partially surrounding each LED chip, where the posts reflect light in a wide pattern to be ultimately directed outward from the LED light source.

DETAILED DESCRIPTION OF THE EMBODIMENTS

Figure 1:
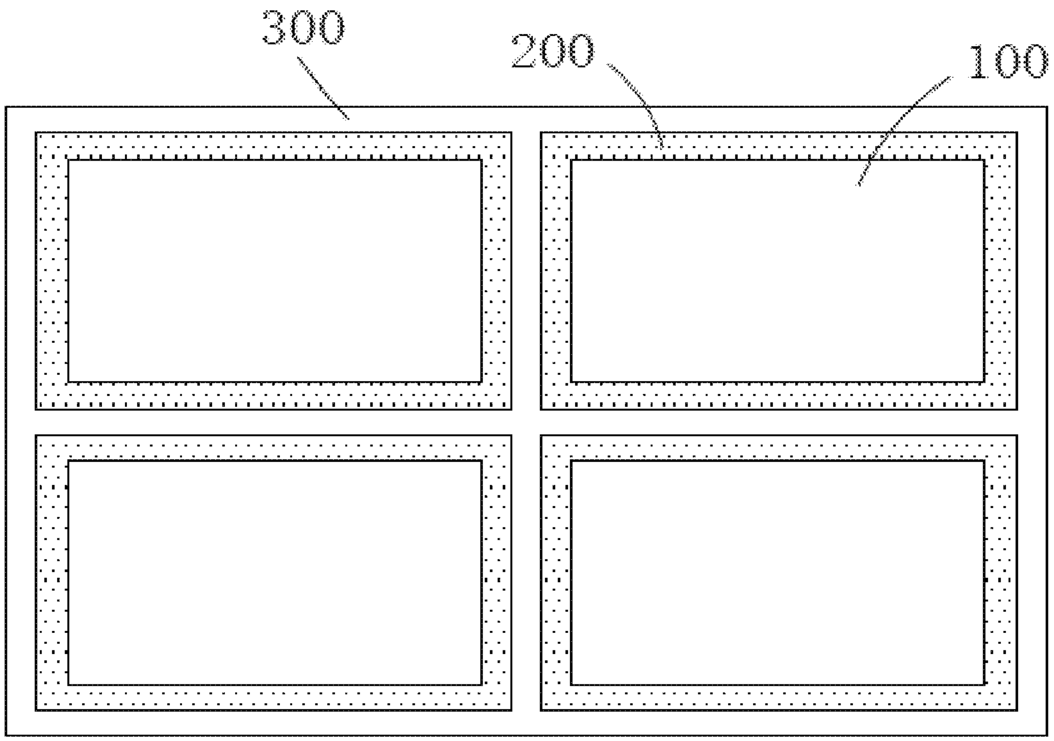
FIG. 1 is a front view of a light-emitting diode (LED) light source with a high luminous efficiency in accordance with the present invention, where a reflective adhesive layer forms angled enclosing walls for each LED chip, and opposite sides of the walls reflect light from adjacent LED chips.
Figure 2:
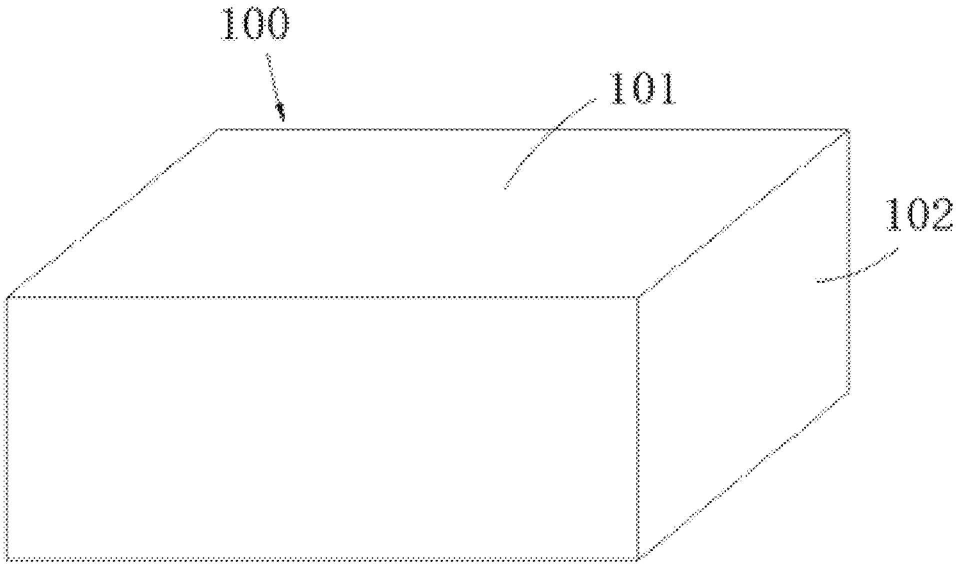
FIG. 2 is a perspective view of a LED chip.
Figure 3:
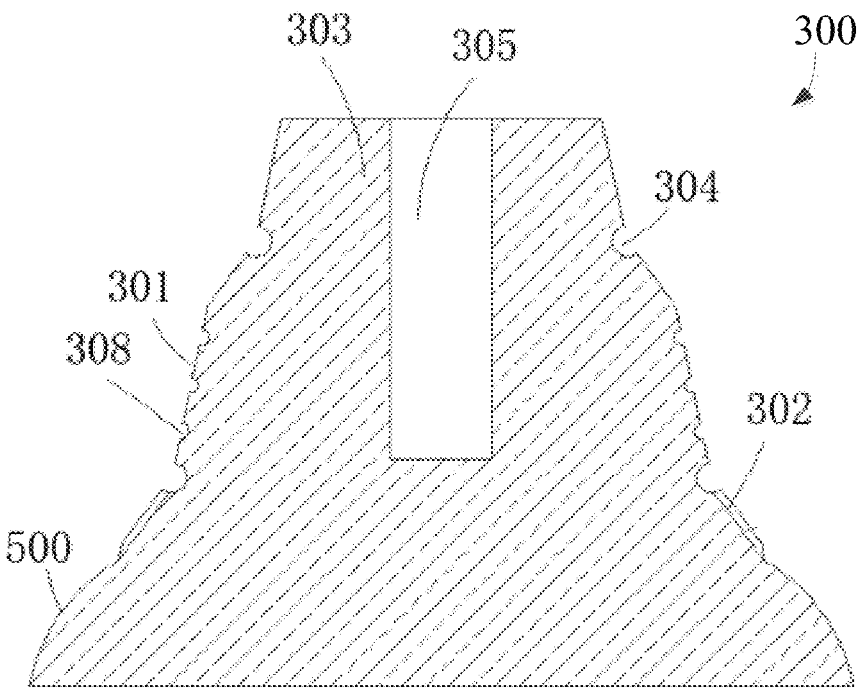
FIG. 3 is a cross-sectional view of an enclosing wall provided by the present invention.
Figure 4:
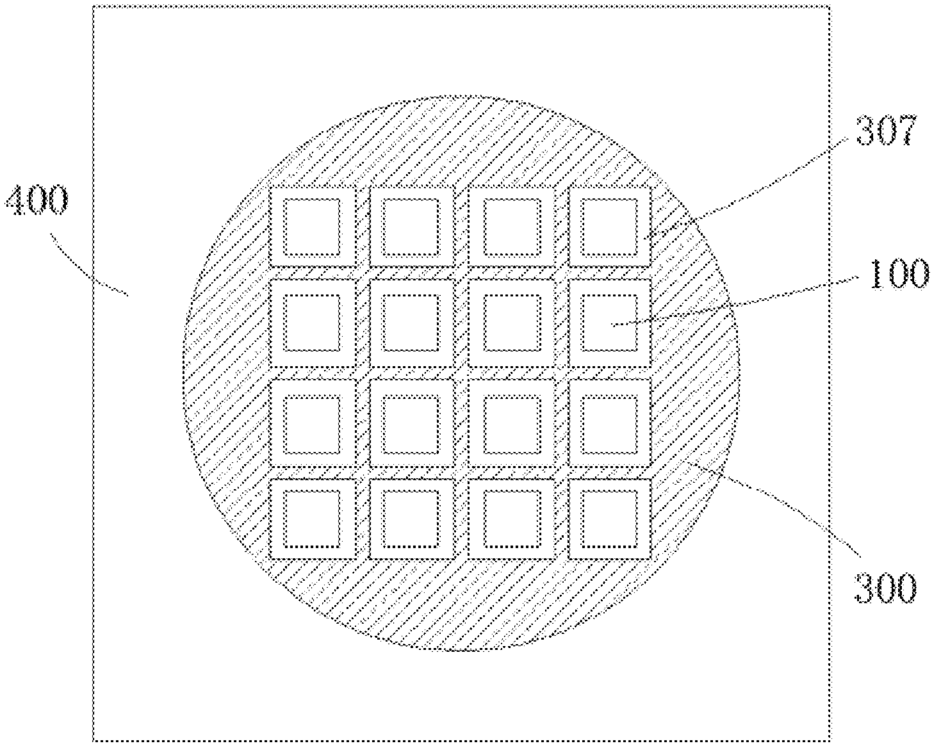
FIG. 4 is a cross-sectional top view of the LED light source, showing the layout of the adhesive layer forming enclosing walls and surrounding all the LED chips.

To make the purposes, technical solutions, and advantages of the present invention clearer, the following further describes an embodiment of the present invention in detail with reference to the accompanying drawings. It should be understood that specific embodiments described herein are merely used to explain the present invention but not to limit the present invention.

The implementation of the present invention is described in detail below with reference to specific embodiments.

The same or similar reference numerals in the accompanying drawings of the embodiments correspond to the same or similar parts. In the description of the present invention, it should be understood that the orientations or positional relationships indicated by the terms "upper", "lower", "left", "right" and the like (if existent) are in accordance with those shown in the accompanying drawings, and are intended only for the convenience of describing the present invention and simplifying the description rather than for indicating or implying that the referred devices or elements must have a particular orientation or constructed or operated in a particular orientation. Therefore, the terms used to describe the positional relationships in the accompanying drawings are only for illustrative purposes and are not to be construed as limiting the present patent. The specific meaning of the terms described above will be understood by those of ordinary skill in the art according to the specific circumstances.

FIGS. 1-8 show preferred embodiments of the present invention.

The LED light source with a high luminous efficiency includes a support 400 (FIGS. 5 and 6), where a recessed light-emitting area 401 (FIG. 6) is provided on the support 400. The support 40 may comprise a heat-sinking reflective aluminum. A printed circuit on a thin dielectric layer on the light-emitting area 401 is electrically connected to bottom electrodes on the surface-mounted LED chips 100. A plurality of LED chips 100 are arranged in an array and supported on the light-emitting area 401. Adjacent LED chips 100 are arranged with gaps between them. Each LED chip 100 has a top light-emitting surface 101 (FIG. 2) and a plurality of side light-emitting surfaces 102.

When the LED chip 100 emits light, the plurality of side light-emitting surfaces 102 and the top light-emitting surface 101 of the LED chip emit light in an outward direction.

The light-emitting area 401 is provided with a molded adhesive layer, also referred to as a glue layer 300 (FIGS. 1, 4, and 5), for reflecting light. An empty area is surrounded by walls of the glue layer 300 to form an array of empty areas, and an LED chip 100 is located in each of the associated empty areas. The glue layer 300 forms an enclosing wall 303 (FIG. 3) surrounding each empty area. After the LED chips 100 are mounted in each empty area, the enclosing wall 303 faces the side light-emitting surface 102, and a gap 307 (FIG. 4) is formed between the peripheral side of the LED chip 100 and the enclosing wall 303.

The glue layer 300 may be made of various types of materials, as long as it can reflect light, and is generally made of an opaque material. In one embodiment, the glue layer 300 comprises silicone infused with reflecting particles, such as flakes of white paint. The white flakes may be titanium oxide, zinc oxide, or other reflective materials.

Along a height direction of the glue layer 300, the enclosing wall 303 is inclined outwards away from the LED chip 100. A lower part of the enclosing wall 303 (FIG. 3) protrudes towards the LED chip 100 to form a convex arc-shaped surface 500 (FIG. 3), and the arc-shaped surface 500 extends downwards to abut the bottom of the light-emitting area 401.

When light emitted from the side light-emitting surface 102 of the LED chip 100 in the empty area irradiates the enclosing wall 303 and the arc-shaped surface 500, the enclosing wall 303 and the arc-shaped surface 500 reflect the light emitted from the side light-emitting surface 102, so that the light irradiates outwards away from the light-emitting area 401. In addition, the arc-shaped surface 500 reflects the light emitted from the side light-emitting surface 102 in multiple directions, enabling the light to irradiate outwards away from the light-emitting area 401, thereby achieving the purpose of multi-directional irradiation. Much of the light emitted by the side surfaces of the LED chip first reflects off the light emitting area 401 in the gap and then impinges on the convex arc-shaped surface. The light reflecting off the arc-shaped surface reflects the light upward at a steep angle so as not to impinge back on the side wall of the LED chip.

The arc-shaped surface 500 is formed at the lower part of the enclosing wall 303, and the enclosing wall 303 surrounds the LED chip 100 (separated by the annular gap 307), so the light emitted from the side light-emitting surface 102 is reflected at multiple slope angles away from the light-emitting area 401, thereby greatly improving the luminous efficiency of the LED light source. In addition, the light emitted from the side light-emitting surface 102 is reflected outwards by the enclosing wall 303, avoiding direct irradiation between the LED chips 100, and therefore the temperature of the LED light source is lowered, and the lifetime of the LED light source is increased.

The LED chip 100 has a square or rectangular shape, the LED chip 100 has four side light-emitting surfaces 102, and the enclosing wall 303 has a corresponding shape and encloses the LED chip 100. In this way, the light rays emitted from the four side light-emitting surfaces 102 are all reflected by the enclosing wall 303, further improving the luminous efficiency of the LED light source.

Figure 5:
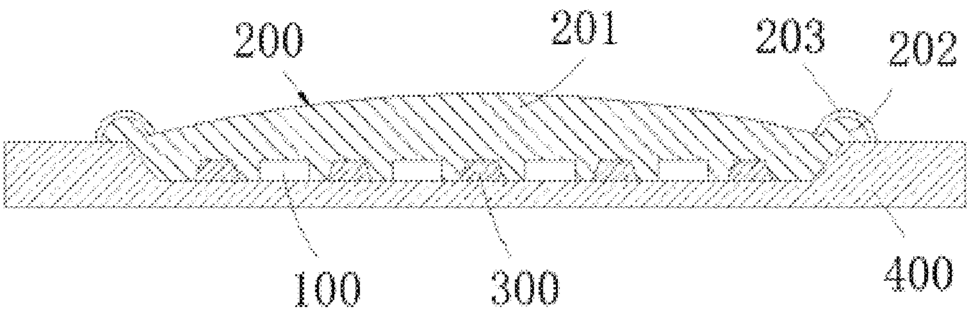
FIG. 5 is a cross-sectional view of the LED light source, with the light emitting area filled with a fluorescent material (e.g., YAG) that converts the LED light to a different wavelength (e.g., yellow) and allows some of the primary LED light (e.g., blue) to leak through to mix the light and create white light.
Figure 6:
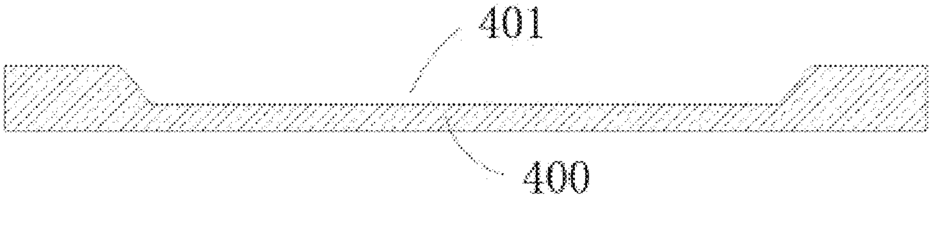
FIG. 6 is a cross-sectional view of a reflective support (e.g., aluminum), where an edge of the light emitting area comprises a sloped wall.

A top of the glue layer 300 is arranged approximately flush with the top light-emitting surface 101 (FIG. 5), thus ensuring that all light rays emitted from the side emitting surfaces 102 are reflected by the enclosing wall 303. Light rays from the top surface are not reflected by the enclosing wall 303, resulting in a wide beam The glue layer 300 is covered with a light-transmitting fluorescent layer 200 (FIG. 5). The fluorescent layer 200 covers the top light-emitting surface 101 and the top of the glue layer 300, and the fluorescent layer 200 fills the annular gap 307 and abuts against the enclosing wall 303 and the side light-emitting surface 102.

The fluorescent layer 200 not only covers the glue layer 300, but also is embedded in the annular gap 307 so as to be combined with the glue layer 300 to form an integral structure. The light emitted from the top light-emitting surface 101 is directly transmitted through the fluorescent layer 200 to irradiate outwards, and the light emitted from the side light-emitting surface 102 is reflected by the enclosing wall 303 and then transmitted through the fluorescent layer 200 to irradiate outwards. In one embodiment, the LED chips emit blue light, the fluorescent layer 200 is YAG, which emits a yellow light, and the combination of the light wavelengths produce white light for illumination, since some of the blue light leaks through the fluorescent layer 200.

In the present embodiment, a top of the support 400 is recessed downwards to form the above-mentioned light-emitting area 401 (FIG. 5), and bottoms of the plurality of LED chips 100 are fixed at a bottom of the light-emitting area 401.

The top light-emitting surface 101 is lower than the top of the support 400, so that the top light-emitting surface 101 is covered by the fluorescent layer 200 when the fluorescent layer 200 is subsequently deposited, causing some of the light emitted from the top light-emitting surface 101 to be transmitted through the fluorescent layer 200.

The top of the fluorescent layer 200 forms a spherical protrusion 201 (FIG. 5) extending above the light-emitting area 401. In this way, light emitted from the light-emitting area 401, including light emitted from the top light-emitting surface 101 and light reflected by the side light-emitting surface 102, is transmitted through the protrusion 201 of the fluorescent layer 200 to irradiate outwards. The spherical shape of the protrusion 201 allows the irradiating light to be more concentrated, resulting in a bright beam of light. The spherical protrusion 201 maintains a fairly uniform color temperature across a wide viewing angle.

A peripheral side of the fluorescent layer 200 forms a surrounding ring 202 (FIG. 5) extending beyond the light-emitting area 401. The surrounding ring 202 is convexly arranged on the support 400. The surrounding ring 202 is coated with a light-reflecting layer 203 (e.g., a metal), so that the peripheral side of the fluorescent layer 200 is surrounded. The surrounding ring 202 reflects back the light emitted from the peripheral side of the light-emitting area 401, so that the LED light source irradiates in a more concentrated manner.

The enclosing wall 303 is provided with a plurality of flat inclined surfaces 301 and 302 arranged obliquely. The inclined surfaces 301/302 are inclined outwards away from the LED chip 100 along the height direction of the glue layer 300, and the inclining angle of the inclined surfaces 301/302 are different from one another.

By arranging the inclined surfaces 301/302 at different angles, the light emitted from the side light-emitting surface 102 is reflected at multiple angles to smooth the light output to be more uniform across a wide viewing angle.

A plurality of horizontal, grooves 304 and 308 are disposed in some of the inclined surfaces 301/302. The fluorescent layer 200 is embedded in the plurality of grooves 304/308 to cause the fluorescent layer 200 to be integrally connected with the glue layer 300.

An interior of the enclosing wall 303 is formed to have a hollowed-out area 305 (FIG. 3), forming a vertical groove. A bottom of the hollowed-out area 305 is closed, and the hollowed-out area 305 runs through the top of the glue layer 300. In this way, the integrated glue layer 300 has a better elastic deformation capability during temperature variations to reduce stress. In the process of forming the fluorescent layer 200, the fluorescent layer 200 is embedded and fills the hollowed-out area 305, and there is a hollow space between the fluorescent layer and the bottom of the hollowed-out area 305. In this way, the glue layer 300 and the fluorescent layer 200 are better combined into an integral structure, while the elastic deformation effect of the glue layer 300 is maintained, and, when the LED light source is impacted, the impact force can be buffered, which greatly improves the service life of the LED light source.

The glue layer 300 may be arranged in a shape of continuous strips to form the plurality of above-mentioned empty areas by criss-cross intersection, as shown in FIGS. 1-6.

Figure 7:
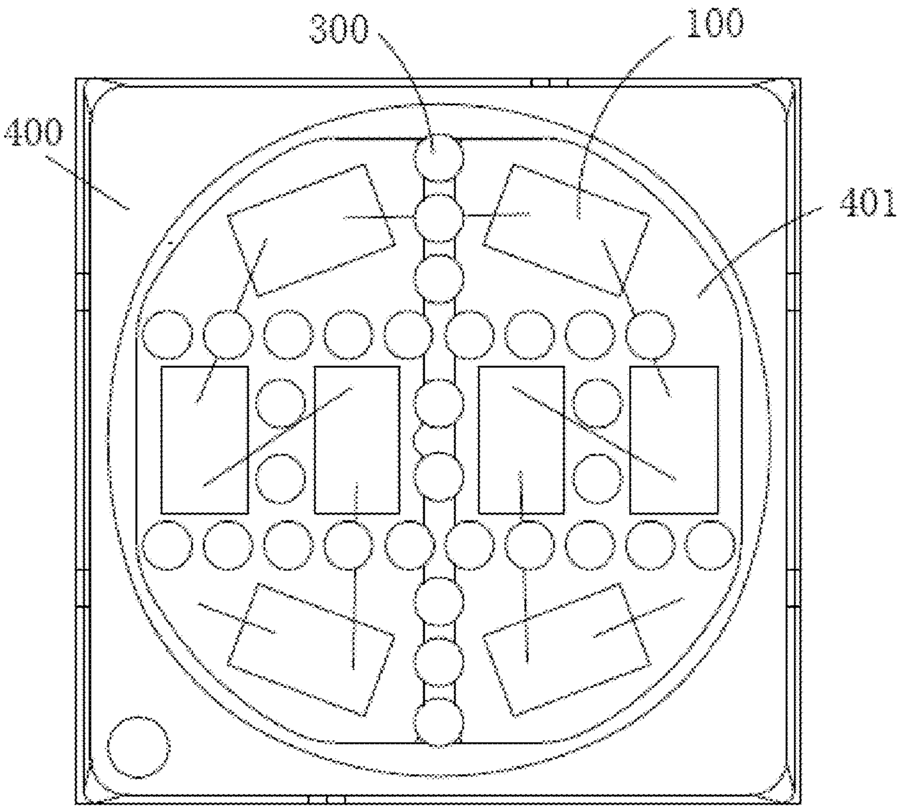
FIG. 7 is a schematic front view of an alternate embodiment LED light source with a high luminous efficiency, where a reflective adhesive layer forms reflective posts partially surrounding each LED chip.
Figure 8:
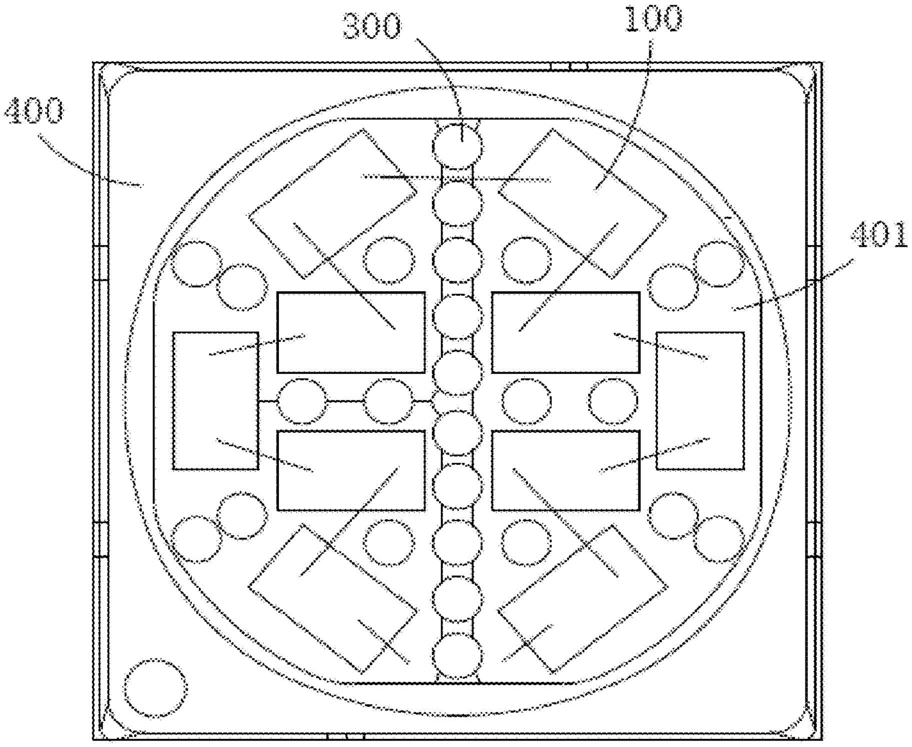
FIG. 8 is a schematic front view of a LED light source, similar to FIG. 7 but with the LED chips oriented in a different manner.

Alternatively, as shown in FIGS. 7 and 8, the glue layer 300 may be molded to form reflectors in a discontinuous manner. In FIGS. 7 and 8, the glue layer 300 may be a plurality of cylindrical posts arranged at intervals, and the above-mentioned empty areas are partially surrounded by the glue posts. The glue layer 300 of FIGS. 7 and 8 is deposited in the light emitter area 401, shown in FIG. 6, which has a reflective base.

FIG. 8 is similar to FIG. 7 but the LED chips are oriented differently.

By disposing the glue layer 300 in a discontinuous manner, the distribution of the plurality of empty areas can be diversified, facilitating a variety of possible arrangements of the LED chips 100, where the following advantages are achieved:

1) the empty areas can be more evenly distributed, improving the luminous uniformity of LED chips 100;
2) the plurality of empty areas can be evenly arranged in the light-emitting area 401 according to actual needs, so that the light spot effect of the LED light source is optimized, light distribution is facilitated, and the visual effect is controllable;
3) the light loss from the side light-emitting surface 102 of the LED chip 100 is reduced, optimizing the light loss;
4) the cylindrical posts reflect and spread the light for a more uniform beam;
5) the light that impinges on the slanted, reflective perimeter wall of the support 400 (see FIG. 5) is reflected away from the reflective light emitter area 401;
6) the reflected light can form a very wide and uniform beam;
7) the fluorescent layer 200 covers the posts and LEDs and converts the blue light to, for example, yellow light, which is uniformly emitted in all directions, further improving the uniformity of the white light emitted from the light source; and 7) the LEDs can be positioned at a variety of angles to further mix the light.

The above only describes a preferred embodiment of the present invention and is not intended to limit the present invention. Any modifications, equivalent substitutions, and improvements made within the spirit and principle of the present invention shall fall within the protection scope of the present invention.

What is claimed is:

1. A light-emitting diode (LED) light source, comprising;

a support, wherein a light-emitting area is provided on the support;

a plurality of LED chips disposed on the light-emitting area, the LED chips being spaced from one another, a top of each LED chip having a top light-emitting surface, and each LED chip having a plurality of side light-emitting surfaces;

a reflective layer disposed on the light-emitting area, the reflective layer forming a plurality of enclosing walls, each enclosing wall surrounding a single LED chip, with a gap between the side light-emitting surfaces of each LED chip and its associated enclosing wall, where each enclosing wall has a height approximately equal to a height of each LED; and along a height direction of each enclosing wall for each LED chip, the enclosing wall is inclined outwards away from the LED chip to form a curved surface, such that, when light emitted from the side light-emitting surfaces of the LED chip irradiates the enclosing wall and the curved surface, the enclosing wall reflects light emitted from the side light-emitting surfaces in multiple angular directions, so that the light irradiates outwards away from the light-emitting area, wherein the enclosing wall is provided with at least three differently inclined surfaces, where each inclined surface has a flat surface with an angle different from other inclined surfaces, each of the inclined surfaces being inclined outwards away from the LED chip along the height direction of the enclosing wall, and wherein the enclosing wall for each LED chip comprises a rounded convex lower section.

2. The LED light source according to claim 1, wherein the LED chip has a square shape, and the enclosing wall for each LED chip has a square shape and encloses each LED chip.

3. The LED light source according to claim 1, wherein the reflective layer is covered with a light-transmitting fluorescent layer, the fluorescent layer covering the top light-emitting surface and the top of the reflective layer, wherein the fluorescent layer fills the gap and abuts against the enclosing wall and the side light-emitting surfaces.

4. The LED light source according to claim 1, wherein a top of the support is recessed to form the light-emitting area, the light emitting area being reflective, and bottoms of the plurality of LED chips are fixed at a bottom of the light-emitting area.

5. The LED light source according to claim 1, wherein the top light-emitting surfaces are lower than a top of the light-emitting area.

6. The LED light source according to claim 1, wherein the reflective layer is covered with a light-transmitting fluorescent layer, the fluorescent layer covering the top light-emitting surface and the top of the reflective layer, wherein the fluorescent layer fills the gap and abuts against the enclosing wall and the side light-emitting surfaces, wherein a top of the fluorescent layer protrudes upwards at its periphery to form a protrusion extending above the light-emitting area, wherein a surface of the protrusion is substantially spherical.

7. The LED light source according to claim 6, wherein a peripheral side of the fluorescent layer is provided with a surrounding ring extending beyond the light-emitting area, the surrounding ring being convexly arranged on the support, the surrounding ring being coated with a light-reflecting layer to reflect light emitted from the peripheral side of the light-emitting area.

8. The LED light source according to claim 1, wherein a plurality of recessed inclined grooves is disposed on at least one of the inclined surfaces; and a fluorescent layer being embedded in the plurality of inclined grooves.

9. The LED light source according to claim 1, wherein the enclosing wall for each LED chip comprises:

a rounded convex lower section;

a first flat inclined surface above the convex lower section;

a second flat inclined surface above the first flat inclined surface, where the second flat inclined surface is at an angle that is steeper than an angle of the first flat inclined surface; and a third flat inclined surface above the second flat inclined surface, where the third flat inclined surface is at an angle that is less inclined than an angle of the second flat inclined surface.

10. The LED source according to claim 9, further comprising a fourth flat inclined surface above the third flat inclined surface, where the fourth flat inclined surface is steeper than the third flat inclined surface.

11. The LED source according to claim 9 further comprising grooves in the second flat inclined surface.

12. The LED source of claim 9 further comprising a vertical groove in each enclosing wall.

13. The LED source of claim 9, wherein one side of an enclosing wall reflects light from a first one of the LED chips, and an opposite side of the enclosing wall reflects light from a second one of the LED chips.

14. The LED source of claim 1 where the support forms an angled wall surrounding all the LED chips in the light emitting area.

15. The LED source of claim 1, wherein one side of an enclosing wall reflects light from a first one of the LED chips, and an opposite side of the enclosing wall reflects light from a second one of the LED chips.

16. The LED source according to claim 1, wherein the enclosing wall for each LED chip comprises:

a first flat inclined surface above the light emitting area;

a second flat inclined surface above the first flat inclined surface, where the second flat inclined surface is at an angle that is steeper than an angle of the first flat inclined surface; and a third flat inclined surface above the second flat inclined surface, where the third flat inclined surface is at an angle that is less inclined than an angle of the second flat inclined surface.

* * * * *